United States Patent [19]

Goebel

[11] 4,020,248
[45] Apr. 26, 1977

[54] PRIMARY ELECTROCHEMICAL CELL CAPABLE OF HIGH DISCHARGE RATES

[75] Inventor: Franz Goebel, Ashland, Mass.

[73] Assignee: GTE Laboratories Incorporated, Waltham, Mass.

[22] Filed: Sept. 18, 1975

[21] Appl. No.: 614,451

[52] U.S. Cl. ............................... 429/164; 429/194; 429/218
[51] Int. Cl.² ......................................... H01M 6/14
[58] Field of Search .......... 136/121, 122, 22, 83 R, 136/13, 107, 100 R, 83 R, 86 D, 120 FC; 429/94, 178, 164, 194, 218, 241

[56] References Cited

UNITED STATES PATENTS

| | | | |
|---|---|---|---|
| 3,510,353 | 5/1970 | McHenry | 136/13 |
| 3,676,222 | 7/1972 | Deibert | 136/121 |
| 3,796,606 | 3/1974 | Lehmann et al. | 136/13 |
| 3,870,565 | 3/1975 | Bonnemay et al. | 136/86 A |
| 3,922,174 | 11/1975 | Heller | 136/6 LN |

*Primary Examiner*—Anthony Skapars
*Attorney, Agent, or Firm*—Irving M. Kriegsman

[57] ABSTRACT

A primary electrochemical cell is described which is capable of achieving high discharge currents. The primary electrochemical cell incorporates a novel cathode structure. That cathode structure has a cathode current collector which is comprised with a plurality of electrically interconnected layers of a porous metallic material such as a nickel screen. Interposed between the layers of the cathode current collector are layers of globules of a cathode material. This material has a composition of from about 40 to 99 weight percent of carbon black, at least 1 weight percent of a mechanical binder which is inert in the primary electrochemical cell and the remainder is graphite. When such a cathode structure is incorporated into a primary electrochemical cell, two features are obtained which contribute to the high discharge current capability of the cell. Firstly, because a multitude of globules of cathode material are utilized in the cathode structure along with a porous current collector, large channels are maintained throughout the cathode structure thereby greatly facilitating the diffusion of the electrolytic solution of the cell, throughout the cathode structure. Secondly, the conductive cathode current collector extends throughout the cathode structure and is in close contact with all of the cathode material.

19 Claims, 3 Drawing Figures

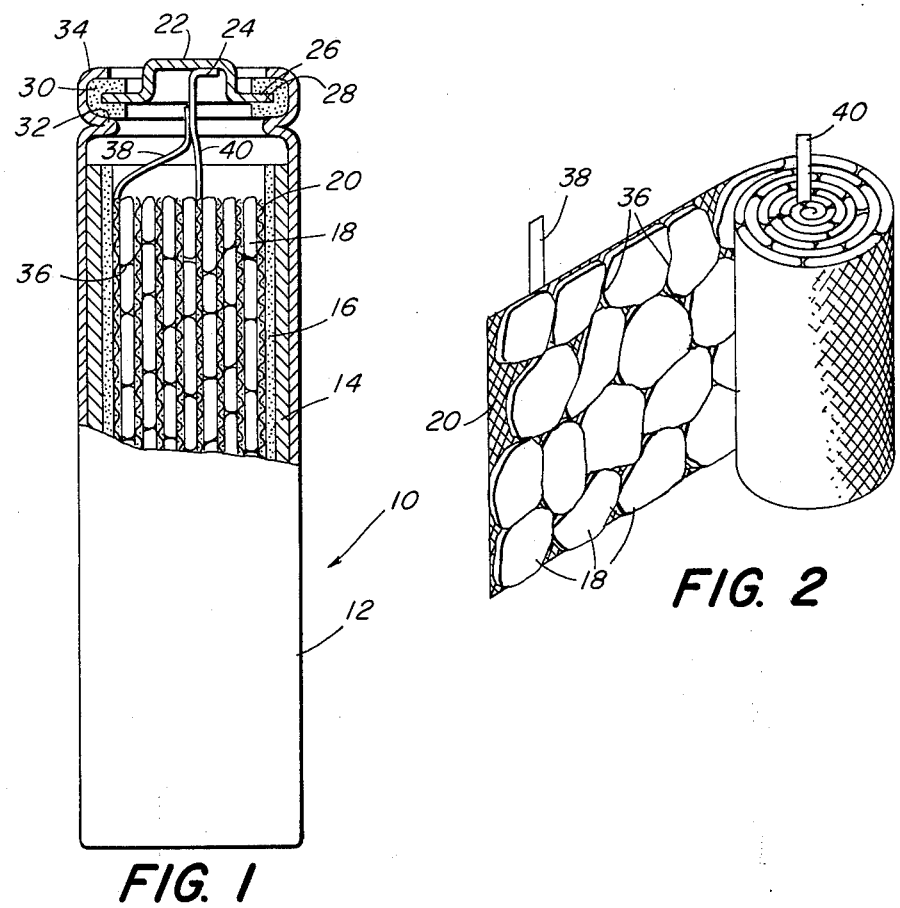
FIG. 1
FIG. 2
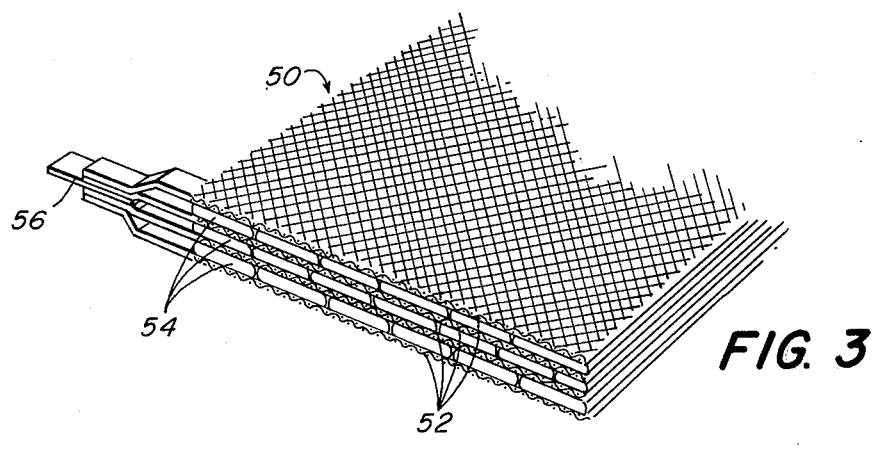
FIG. 3

PRIMARY ELECTROCHEMICAL CELL CAPABLE OF HIGH DISCHARGE RATES

BACKGROUND OF THE INVENTION

The present invention is related generally to primary electrochemical cells and is more particularly concerned with a novel cathode structure for use in such cells which results in high discharge current capability.

Primary electrochemical cells are utilized for a wide variety of applications and are commonly available in a significant assortment of sizes, shapes and discharge capabilities. In some applications, such as electronic watches and heart pacers, a very low discharge current is required. In others, such as portable lighting sources, high discharge current capabilities are often required. This is particularly true with some high intensity portable light sources.

A number of electrochemical systems are known to be incorporable into such primary electrochemical cells and these electrochemical systems afford great variation in discharge capabilities as well. A large portion of these systems utilize a carbon cathode material. Typically, carbon cathode material is formed as a paste and depositied as such within the electrochemical cell container. Because of the fluid form of this paste, albeit viscous, it has been necessary to place a heavy separator between the carbon cathode material and the particular anode material utilized. This separator was required to prevent direct contact between the anode and cathode materials, Necessarily, these separators became quite thick to prevent self-discharging of the cells due to internal shorts between the anode and cathode materials. Such a thick separator naturally increases the internal resistance of the cell thereby decreasing the output current that may be derived therefrom.

An internal construction for primary electrochemical cells which has been utilized for providing such cells with high discharge capabilities is shown in U.S. Pat. No. 3,510,353 to McHenry. In this construction, successive layers of the cathode material, a separator, the anode material, and another separator are rolled, in "jelly roll" fashion so that the anode and cathode materials are in close proximity to each other throughout the volume of the cell. This arrangement is capable of being discharged at relatively high currents. However, heat is released during the electrochemical process. When the anode and cathode materials are dispersed throughout the volume of the cell as in this configuration, the heat is not easily removed from the package and causes a thermal build-up within the cell. In some cell configurations, this heat build-up can become dangerous. For example, in a recently developed class of primary electrochemical cells where a lithium or other alkali metal is utilized as the anode with electrolytic solutions which include a solvent material which can be reduced electrochemically on the surface of the carbon cathode, the thermal build-up can cause the alkali metal to reach its melting temperature at which an extremely rapid reaction between the anode material and the reaction products produced during cell operation can occur. An over-pressurization condition within the cell container is rapidly established and the subsequent rupture thereof is caused.

SUMMARY OF THE INVENTION

Accordingly, it is an object of the present invention to provide a novel primary electrochemical cell configuration which is capable of achieving a high discharge current.

It is a second object of the invention to provide such a primary electrochemical cell in which a thermal build-up condition is effectively prevented.

It is another object of the invention to provide such a primary electrochemical cell which is simple in construction and capable of achieving high reliability.

In its broadest aspect, the present invention comprises a primary electrochemical cell which is capable of achieving high discharge currents. The primary electrochemical cell has a hollow outer cell casing. The casing has a first terminal on the exterior thereof and houses an electrochemical system for the primary electrochemical cell. The electrochemical system includes an anode material connected to the first terminal, a cathode material, and electrolytic solution therein. The cathode material comprises an aggregate of porous semi-rigid globules having the following composition: from about 40 to 99 weight percent of carbon black, at least 1 weight percent of mechanical binder which is inert in the primary electrochemical cell, and the remainder being graphite. The electrolytic solution includes a solvent material which can be electrochemically reduced on the surface of the carbon cathode. A porous separator is provided to electrically separate the anode material from the cathode material. A second terminal is located on the exterior of the outer casing and means are provided for electrically insulating the second terminal from the first terminal. A cathode current collector connects the cathode material to the second terminal and comprises a plurality of electrically interconnected layers of a porous metallic material. The cathode material globules are interposed between the layers of the cathode current collector so that the cathode current collector extends throughout the cathode material.

Further objects, advantages, and features of the invention will be apparent from the following detailed description of the preferred embodiment taken together with the accompanying drawing.

BRIEF DESCRIPTION OF THE DRAWING

In the Drawing:

FIG. 1 is a side elevation view of a primary electrochemical cell according to the present invention which is partially in section;

FIG. 2 is an isometric view of a partially unrolled cathode structure for use in the primary electrochemical cell of FIG. 1; and FIG. 3 is an isometric view of an alternative cathode configuration for use in a primary electrochemical cell according to the present invention.

DETAILED DESCRIPTION OF THE PREFERRED EMBODIMENTS

In referring to the various figures of the drawings hereinbelow, like reference numerals will be utilized to refer to identical parts of the apparatus.

Referring initially to FIG. 1 of the drawing, a primary electrochemical cell embodying the present invention is designated generally by the reference numeral 10. The primary electrochemical cell 10 is comprised of a cylindrical outer casing 12 which is closed at one end and which serves to contain the desired electrochemical system. In many configurations, the outer casing 12 is formed of a conductive material and acts as a first terminal of the primary electrochemical cell 10.

In this embodiment of the invention, a layer of anode material 14 is disposed in mechanical and electrical contact with a conductive outer casing 12 throughout the major portion of the internal length and circumference of the casing 12. In certain configurations, the anode may also be in contact with the bottom of the casing 12. A thin porous separator 16 of nonconductive material is disposed internally of and coextensive with the annulus of anode material 14 to insure electrical isolation between the cathode and anode materials. In the center of the primary electrochemical cell 10, there is located a cathode structure comprising a plurality of layers of cathode material globules 18 which are interposed between alternating layers of a cathode current collector material 20. The layers of the cathode current collector 20 are formed of a porous metallic material and are electrically interconnected.

A top portion 24 of the cathode current collector 20 is specially provided for affixing the cathode current collector 20 to a metallic cathode terminal cap 22. The cathode terminal cap 22 is fitted within the open end of the outer casing 12 and is insulated electrically therefrom by means of an insulating ring 30. The ring 30 supports the cathode terminal cap 22 by receiving a radially extending lower rim 26 of the cap 22 in an internal groove 28. A top lip 34 of the outer casing 12 is rolled or crimped over the upper surface of the ring 30 to bring the various mating surfaces into sealing contact.

Diffused throughout the cathode material globules 18 and the porous separator 16 is a quantity of electrolytic solution. The individual cathode material globules 18 each have a multitude of minute pores in their surfaces for allowing the electrolytic solution of the electrochemical system to contact the individual cathodic particles. In addition, a network of large channels 36 is formed between the globules 18. These channels together with the porous nature of the cathode current collector serve to insure that the electrolytic solution can diffuse readily throughout the cathode material and contact the cathodic particles regardless of the size of the cell. The electrolytic solution is also diffused throughout the porous separator 16. The cathodic material globules are described with particularity in my patent application entitled "A Primary Electrochemical Cell" which is being filed concurrently herewith and which is assigned to the assignee of the present application. The subject matter thereof is incorporated herein by reference.

The cathode material globules have the following general composition: from about 40 to 99 weight percent of carbon black, at least 1 weight percent of a mechanical binder which is inert in the primary electrochemical cell, and the remainder being graphite. The following table provides a number of examples of specific carbon cathode compositions according to the present invention.

| EXAMPLE NO. | GRAPHITE wt. % | CARBON BLACK wt. % | FLUOROCARBON POLYMER BINDER wt. % |
|---|---|---|---|
| 1 | 0 | 99 | 1.0 |
| 2 | 0 | 98 | 2.0 |
| 3 | 0 | 95 | 5.0 |
| 4 | 2.5 | 95 | 2.5 |
| 5 | 3.5 | 93 | 3.5 |
| 6 | 5.0 | 90 | 5.0 |
| 7 | 10 | 85 | 5.0 |
| 8 | 15 | 80 | 5.0 |
| 9 | 20 | 70 | 10.0 |
| 10 | 23 | 74 | 3.0 |
| 11 | 25 | 68 | 7.0 |
| 12 | 25 | 70 | 5.0 |
| 13 | 30 | 65 | 5.0 |
| 14 | 34 | 60 | 6.0 |
| 15 | 38 | 57 | 5.0 |
| 16 | 40 | 55 | 5.0 |
| 17 | 45 | 50 | 5.0 |
| 18 | 50 | 42 | 8.0 |
| 19 | 50 | 40 | 10.0 |
| 20 | 58 | 40 | 2.0 |

The graphite and carbon black utilized in the formation of cathode material globules are preferably of commercial grade or better purity. The graphite particle size is maintained preferably below 650 mesh and the carbon black utilized is preferably compressed about 50 percent. These preferred specifications for the graphite and carbon black are selected to insure a homogeneous product which will not contribute to a deterioration of the discharge parameters of the cell through the incorporation of reactive impurities in the cell.

The preferred mechanical binder for utilization in the cathode material of the present invention is a fluorocarbon polymer which is inert in the primary electrochemical cells of the invention. Two examples of preferred fluorocarbon polymers of particular utility in the present invention are those identified by the tradenames Teflon and Kel-F. Teflon is a registered trademark of E. I. du Pont de Nemours and Company for tetrafluoroethylene fluorocarbon polymers and fluorinated ethylene-propylene resins. Kel-F is a registered trademark of the 3M Company for a series of fluorocarbon products including polymers of chlorotrifluoroethylene and certain copolymers. Examples of the foregoing table may be utilized with either of these commercially available fluorocarbon polymers with essentially equivalent results. The function of fluorocarbon polymers in the present invention is to stabilize the mechanical strength of the cathode globules by forming chain-like connections between the various particles of graphite and carbon black to form a mechanical binding network so that a semi-rigid configuration may be achieved for the cathode material globules.

The particular compositions for the cathode material which are preferred are given in weight percent for the resulting particles:

| | |
|---|---|
| Graphite | 0 – 30 |
| Carbon black | 65 – 99 |
| Fluorocarbon polymers | 1 – 10 |

The particular composition chosen results in a cathode material having varying porosity characteristics. This variance in porosity is beneficial because it permits a concomitant variance in the discharge rates available from the resulting primary electrochemical cells.

Referring now to FIG. 2 of the drawing, there is shown a cathode structure according to the present invention which is partially unrolled to show the precise structure thereof. The construction shown in FIG.

2 of the drawing is preferred because the standard internal configuration for primary electrochemical cells is cylindrical. However, other configurations such as that shown in FIG. 3 are also within the purview of the invention. As shown in FIGS. 1 and 2, a plurality of layers of the cathode current collector 20 have interposed therebetween layers of the globules 18 of cathode material. In the preferred construction, the cathode current collector is rolled with the layer of globules thereon. This produces a pattern of irregularly shaped flat sections for the globules 18 which retain the channels 36 between the globules. With the cathode current collector 20 formed of a porous metallic material such as a screen, the electrolytic solution of the electrochemical system is allowed to diffuse readily throughout the cathode structure and to reach the cathode particles easily. By rolling a single sheet of cathode current collector 20, electrical interconnection is maintained between all layers of the cathode current collector. In this manner, the cathode current collector is dispersed throughout the volume of the cathode material. A pair of tabs 38 and 40 are provided adjacent to the ends of the sheet of cathode current collector 20 to provide interconnection to the cathode terminal of the primary electrochemical cell as shown in FIG. 1. It is also within the purview of the invention that one or more such tabs may be provided throughout the length of the sheet cathode current collector to assist connecting the current collector efficiently to the cell terminal.

A standard test which is performed in determining the discharge capabilities of primary electrochemical cells is to directly short the anode and cathode terminals together external to the cell and to measure the discharge current which flows as a result. In a recent experiment, a primary electrochemical cell formed according to the present invention was so tested together with a cell of identical construction except that the cathode/current collector structure was similar to that shown and described in a copending patent application entitled "A Primary Electrochemical Cell and A Preformed Cathode Therefor" by F. Goebel and W. P. Brissette which is also assigned to the assignee of the present application and which is being filed concurrently herewith. The discharge current from the cell constructed according to the present invention exceeded 12 amperes while the other cell achieved only a 3 amperes current. It can thus be seen that the structure of the present invention is successful in achieving more than a 400 percent increase in the discharge current capability of the primary electrochemical cell. In addition, since the anode material 14 is maintained in physical contact with the outer cell casing 12 and is not dispersed throughout the volume of the cell such as in the "jelly roll" construction, the temperature rise in the cell as a result of the peak discharge currents was well within safety limits of the particular electrochemical system as the heat generated during the reaction is conducted directly out of the cell through the wall of the outer casing 12 since the anode material 14 is in direct contact with the outer casing 12 rather than disposed internally in the cell configuration.

An alternative configuration for the cathode is shown in FIG. 3 of the drawing. In this construction, which is designed for use in flat configurations of primary electrochemical cells, a cathode structure 50 comprises a plurality of layers of a porous metallic cathode current collector 52 having a plurality of interposed layers 54 of cathode material globules as described hereinabove. The layers of cathode current collector 52 are electrically interconnected at 56 in a manner usable for direct connection to the cell cathode terminal. Other such cathode structure configurations are conceivable and are included with the purview of the present invention.

It is further included within the purview of the invention that the cathode current collector may be formed of any material which is conductive and which is essentially inert to any chemical reaction within the primary electrochemical cell. The particular choice of material depends primarily on the particular materials and reactions within the electrochemical system chosen.

The cathode structures of the present invention are for use in primary electrochemical cells which have cathode depolarizers that can be electrochemically reduced on the surface of the carbon cathode, especially those cells having an alkali metal anode and a non-aqueous electrolytic solution. Included in the former groups are the familiar carbon-zinc cells. In the later group are included a recently developed class of cells wherein the electrolytic solution includes an inorganic oxyhalide of sulfur or phosphorus as the solvent material and a solute dissolved therein to make the solution ionically conductive. Suitable oxyhalide solvents are phosphorus oxychloride, thionyl chloride, sulfuryl chloride, or mixtures thereof. Such oxyhalide solvent materials additionally function as cathode depolarizers as they are electrochemically reduced on the surface of the cathode material during operation of the cell. Suitable electrochemical systems (i.e., anode, cathode and solutes) are set forth in copending application Ser. Nos. 493,316, filed 7/26/74, disclosure of which is incorporated herein by reference. The most promising of these cells has a lithium anode and a solvent depolarizer which is selected from the group set forth above. When this electrochemical system is utilized, the preferred cathode current collector is a nickel or stainless steel screen.

A typical cell constructed according to this invention includes a lithium anode, a thionyl chloride-lithium tetrachloroaluminate electrolytic solution and a cathode made up of an aggregate of globules of a mixture of carbon black, a fluorocarbon polymer binder and graphite.

The primary electrochemical cells having a lithium anode and an electrolytic solution as set forth above have been found to be particularly suitable for use with the cathode structures of the present invention. Such cells provide better and more uniform contact between the cathode and current collector materials since the cathode material globules expand during discharge thereby improving contact.

The probability of intracellular shorting is reduced greatly since the cathode material is of a definite shape and can not diffuse through a separator to contact the anode. Therefore, the separator used in the cells having the cathode structure may be very thin thereby greatly reducing the internal cell resistance and increasing cell discharge capability.

Finally, it can be appreciated that a stronger, more easily manufactured primary electrochemical cell results from the incorporation of the present structure. The cathode structure subassembly may be produced early in the cell manufacturing process and merely incorporated at a convenient time.

While there have been shown and described what are considered to be preferred embodiments of the present invention, it will be obvious to those of ordinary skill in the art that various changes and modifications may be made therein without departing from the spirit and scope of the invention as defined by the appended claims.

I claim:

1. A primary electrochemical cell which is capable of achieving high discharge currents comprising
    an outer cell casing,
    a first terminal on the exterior of the casing,
    an electrochemical system for a primary electrochemical cell including
        an anode material connected to the first terminal,
        a cathode material comprising a plurality of porous, semi-rigid, discrete globules having the following composition: from about 40 to 99 weight percent of carbon black, at least 1 percent of a mechanical binder which is inert in the primary electochemical cell, and the remainder being graphite, said discrete globules being spaced from one another to thereby define spaces therebetween, and
        an electrolytic solution including a cathode depolarizer that is electrochemically reduced on the surface of the cathode material during discharge of said cell,
    a porous separator of non-conductive material disposed between the anode material and the cathode material,
    a second terminal located on the exterior of the casing,
    means for electrically insulating the second terminal from the first terminal, and
    a cathode current collector connecting the cathode material to the second terminal, the cathode current collector comprising a plurality of electrically interconnected layers of porous metallic material, the cathode material globules being interposed between the layers of cathode current collector so that the cathode current collector extends throughout the cathode material, the electrolytic solution being diffused throughout the porous separator and the porous cathode current collector through the spaces between the plurality of discrete cathode globules.

2. A primary electrochemical cell according to claim 1, wherein the cathode material globules are at least partially compressed between the layers of the cathode current collector.

3. A primary electrochemical cell according to claim 2, wherein the cathode current collector is an elongated sheet of the porous metallic material.

4. A primary electrochemical cell according to claim 3, wherein the elongated sheet is rolled to form a cylindrical structure.

5. A primary electrochemical cell according to claim 2, wherein the cathode current collector is a plurality of sheets of the porous metallic material and further includes means for electrically interconnecting the plurality of sheets.

6. A primary electrochemical cell according to claim 2, wherein the porous metallic material is a screen-like material.

7. A primary electrochemical cell according to claim 6, wherein the porous metallic material is a nickel containing screen material.

8. A primary electrochemical cell according to claim 2, wherein the mechanical binder is a fluorocarbon polymer.

9. A primary electrochemical cell according to claim 8, wherein the cathode material has the following composition as given in weight percent:

| | |
|---|---|
| Graphite | 0 – 30 |
| Carbon black | 65 – 99 |
| Fluorocarbon polymer | 1 – 10 |

10. A primary electrochemical cell according to claim 1, wherein the anode material includes an alkali metal.

11. A primary electrochemical cell according to claim 4, wherein the electrolytic solution includes a solvent which consists essentially of an inorganic oxyhalide of phosphorus or sulfur, and a solute dissolved therein, said oxyhalide solvent being electrochemically reduced on the surface of the cathode during operation of the cell.

12. A primary electrochemical cell according to claim 11, wherein the solvent is selected from the group consisting of phosphorus oxychloride, thionyl chloride, sulfuryl chloride, and mixtures thereof.

13. A primary electrochemical cell according to claim 12, wherein the anode is lithium.

14. A primary electrochemical cell according to claim 1, wherein the anode is lithium.

15. A primary electrochemical cell which is capable of achieving high discharge currents comprising
    an outer cell casing,
    a first terminal on the exterior of the casing,
    an electrochemical system for a primary electrochemical cell including
        an anode material connected to the first terminal,
        a cathode material comprising a plurality of porous, semi-rigid, discrete globules, said discrete globules being spaced from one another to thereby define spaces therebetween, and
        an electrolytic solution including a cathode depolarizer that is electrochemically reduced on the surface of the cathode material during discharge of said cell,
    a porous separator of non-conductive material disposed between the anode material and the cathode material,
    a second terminal located on the exterior of the casing,
    means for electrically insulating the second terminal from the first terminal, and
    a cathode current collector connecting the cathode material to the second terminal, the cathode current collector comprising a plurality of electrically interconnected layers of porous metallic material, the cathode material globules being interposed between the layers of cathode current collector so that the cathode current collector extends throughout the cathode material, the electrolytic solution being diffused throughout the porous separator and the porous cathode current collector through the spaces between the plurality of discrete cathode globules.

16. A primary electrochemical cell according to claim 15 wherein the cathode current collector is an elongated sheet of the porous metallic material rolled to form a cylindrical structure, and the cathode material globules are at least partially compressed between the layers of the cathode current collector.

17. A primary electrochemical cell according to claim 15 wherein the cathode current collector is a plurality of sheets of the porous metallic material and further includes means for electrically interconnecting the plurality of sheets.

18. A primary electrochemical cell according to claim 15 wherein the electrolytic solution includes a solvent selected from the group consisting of phosphorus oxychloride, thionyl chloride, sulfuryl chloride, and mixtures thereof, and a solute dissolved therein.

19. A primary electrochemical cell according to claim 15, wherein the anode material is lithium.

* * * * *